Figure 6:
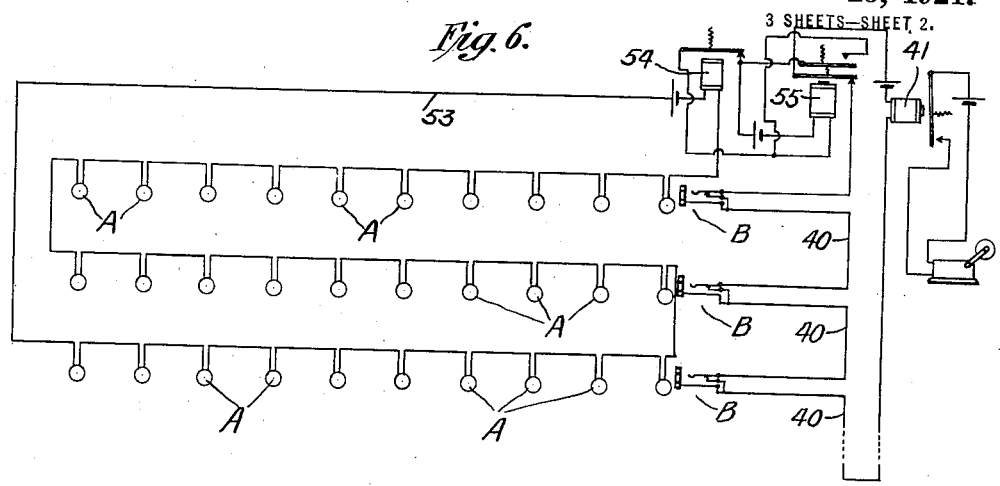

C. C. JOHNSON.
WATCHMAN'S TOUR SIGNAL SYSTEM.
APPLICATION FILED DEC. 28, 1917. RENEWED APR. 28, 1921.
1,394,841.
Patented Oct. 25, 1921.
3 SHEETS—SHEET 1.
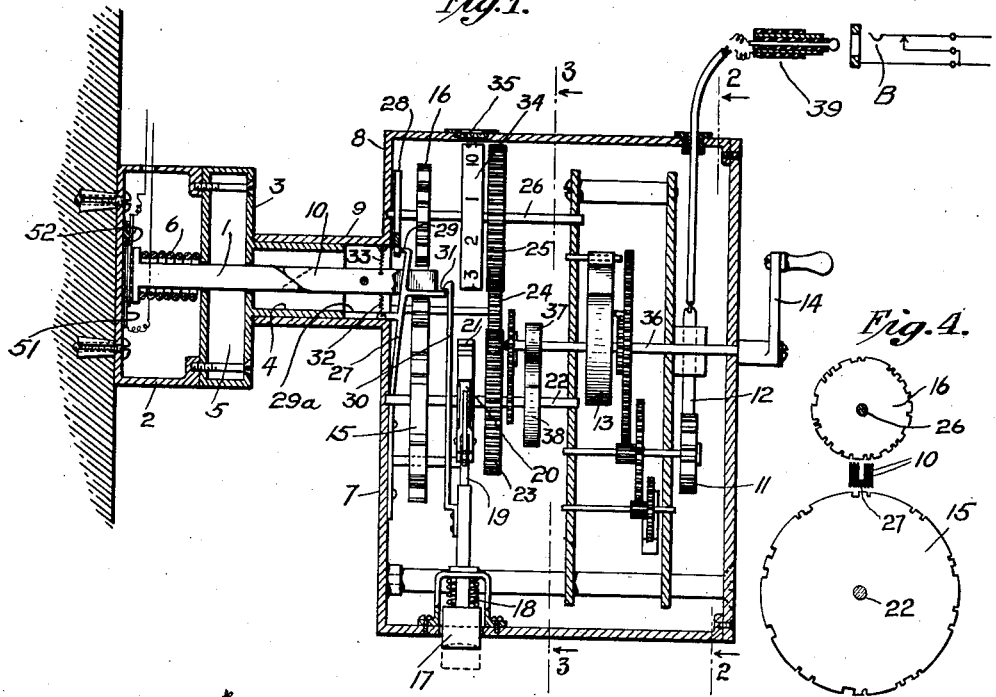
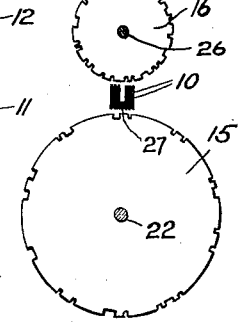
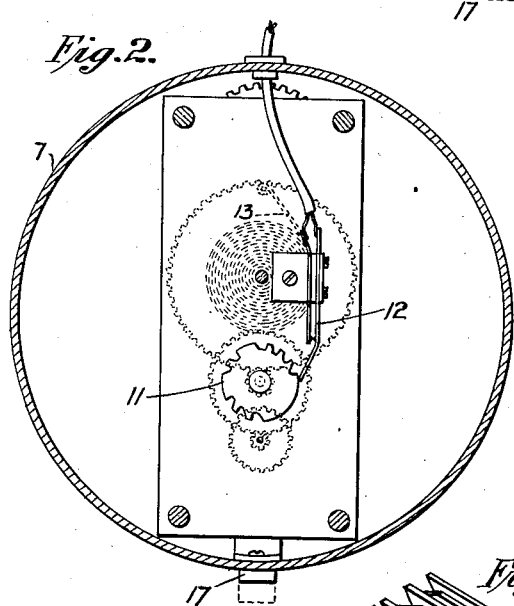
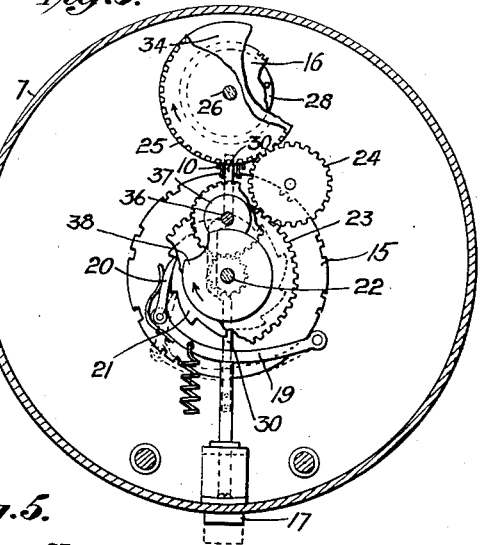
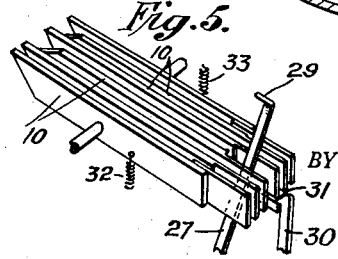
WITNESSES:
INVENTOR.
C. C. Johnson
BY
ATTORNEY C. C. JOHNSON.
WATCHMAN'S TOUR SIGNAL SYSTEM.
APPLICATION FILED DEC. 28, 1917. RENEWED APR. 28, 1921.

1,394,841.

Patented Oct. 25, 1921.

3 SHEETS—SHEET 3.

WITNESSES:

INVENTOR.
C. C. Johnson
BY
ATTORNEY

UNITED STATES PATENT OFFICE.

CLARENCE C. JOHNSON, OF NEW YORK, N. Y., ASSIGNOR TO AMERICAN DISTRICT TELEGRAPH COMPANY, OF JERSEY CITY, NEW JERSEY, A CORPORATION OF NEW JERSEY.

WATCHMAN'S TOUR SIGNAL SYSTEM.

1,394,841. Specification of Letters Patent. Patented Oct. 25, 1921.

Application filed December 28, 1917, Serial No. 209,279. Renewed April 28, 1921. Serial No. 465,248.

*To all whom it may concern:*

Be it known that I, CLARENCE C. JOHNSON, a citizen of the United States of America, and a resident of New York city, county and State of New York, have invented certain new and useful Improvements in Watchmen's Tour Signal Systems, of which the following is a specification.

My invention relates to improvements in signaling systems, and particularly to improvements in watchman's register systems, and comprises a method of and apparatus for registering signals, whereby signals are transmitted to a central station or other registering point, only when and after the watchman has visited all of his stations in turn, and, preferably, in proper sequence.

In the registering or recording of watchman's signals, it is not so necessary that a record be made each time the watchman reaches a station and operates some registering or signaling device thereat, as it is that the central station shall be notified when and after the watchman has visited all of his stations. By reducing the signals to be transmitted to one signal for each watchman at the end of each tour of that watchman, (and such is the result of eliminating separate signals for the several stations visited, and instead sending a signal at the end of the tour) it becomes possible to arrange for the transmission over the same circuit of the signals of a much greater number of watchmen, without material change of signal clashes, than would otherwise be practicable. In this way the efficiency of the system may be greatly increased and the cost of the service can be greatly decreased.

My invention consists, therefore, in a system and apparatus for registering watchmen's signals and the like, wherein signals are transmitted at the end of each tour only and can be transmitted only in case, in such tour, all stations have been visited, and, preferably, visited in proper sequence. Other features of my invention will be pointed out hereafter.

The object of my invention is to simplify systems and apparatus for registering watchmen's signals and the like; to permit the safe use of a single circuit for the signals of a greater number of watchmen than has been practicable heretofore; and, for the accomplishment of the above objects, to arrange for the transmission of signals at the end of each tour only, and then only in case all stations have been visited in proper sequence, instead of, according to the present practice, transmitting signals from each station visited by the watchman.

Figure 7:
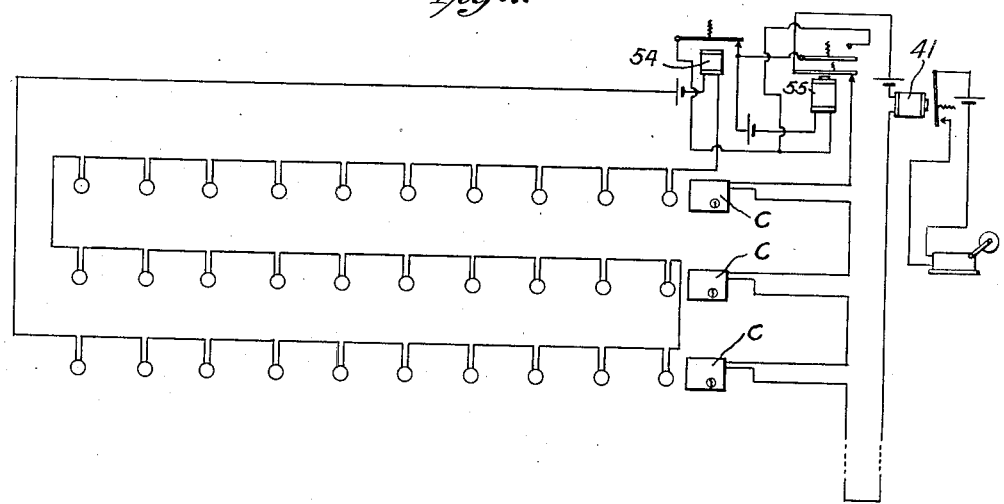
Figure 8:
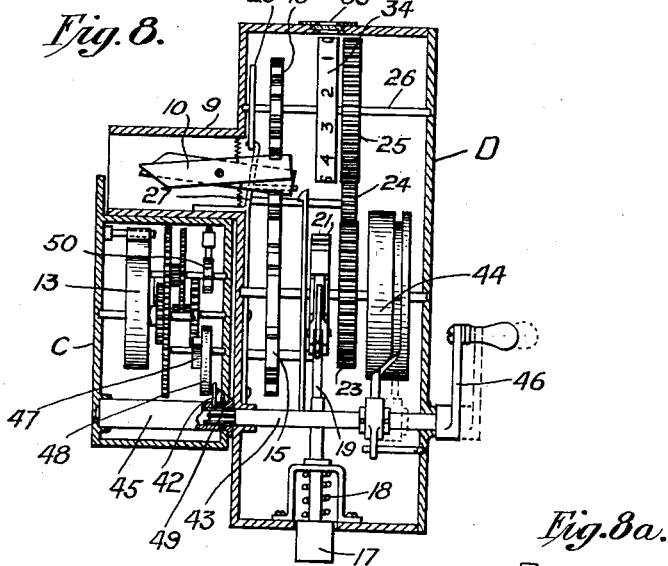
Figure 8A:
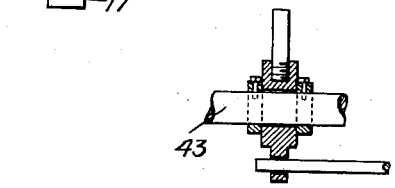
Figure 9:
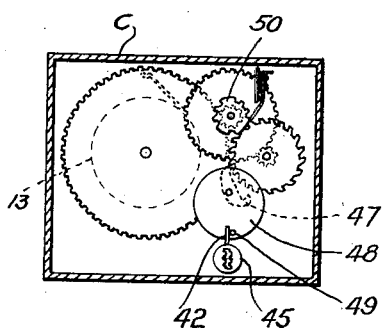
Figure 10:
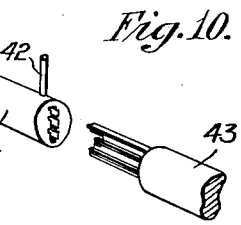

I will now proceed to describe my invention with reference to the accompanying drawings, in which Figure 1 shows a sectional elevation of the key box at one of the stations to be visited by the watchman, and a similar section of the register to be carried by the watchman, the mechanism in this register being shown, in the main, in elevation. Fig. 2 shows a transverse section of the watchman's register on the line 2—2 of Fig. 1. Fig. 3 shows a transverse section of the watchman's register on the line 3—3 of Fig. 1. Fig. 4 shows a detail front elevation of the two notched disks of the locking device of the watchman's register together with the locking levers associated therewith. Fig. 5 shows a detail elevation of the locking levers and associated parts. Fig. 6 is a diagram showing key boxes of a plurality of watchmen's tour routes together with plug sockets and the circuits of the system. Fig. 7 is a view similar to Fig. 6, except that a signal transmitter is shown adjacent to the final key box of each watchman's tour route. Fig. 8 shows a central vertical section of an alternative form of watchman's register, which is without transmitting means, together with a transmitter also shown in central vertical section, but to which that watchman's register is shown as applied; such signal register being located as in Fig. 7; Fig. 8ª is a detail fragmentary vertical section of a portion of the mechanism of the watchman's register of Fig. 8 Fig. 9 shows a central vertical section of the transmitter of Fig. 8. Fig. 10 shows a detail perspective elevation of the transmitter locking device and the co-acting portion of the watchman's signal register.

In Fig. 1, 1—1 designate a plurality of what may be termed "key-shanks", located within a casing 2, and guarded thereby and also by a cover 3 for that casing, having a tubular extension 4 and a hollow base 5, held to the casing 2; a spring 6 surrounding the key-shanks 1 being pressed against the broad bases of these key-shanks by the cover 3, so that these key-shanks are held in place, partly by the pressure of the spring, and partly by the guidance derived from the aperture in the cover through which those key-shanks project; this cover being held to the shell 2 by suitable screws, the idea being that if an ill-intentioned person should remove the cover, the key-shanks will fall away as the cover is removed, thus preventing that person from learning the particular arrangement of the key-shanks which existed before the removal of the cover. The device 1—2—4 constitutes a "watchman's-register conditioning device", and one such conditioning device will be located at each station to be visted.

7 designates, generally, a register to be carried by the watchman from place to place, and comprising a casing 8, having a tubular extension 9, adapted to fit over the tubular extension 4 of the key box at each station. Within this watchman's register there are a plurality of levers 10 corresponding coöperatively to the key-shanks 1 at the several key stations. The register, in the form shown in Fig. 1, further comprises suitable signal transmitting mechanism comprising a break wheel 11, a contact pen 12, and mechanism for driving that break wheel, arranged to be driven by a spring 13 and to be wound by the watchman, by means of a crank handle 14; the signal mechanism being similar to that of an ordinary messenger call box, except for means hereinafter described which permits the operation of the signal mechanism, only in the event that the watchman has visited all of the stations and at each such station has used his register correctly.

15 and 16 designate peripherally-notched wheels, the notches of which are adapted to receive the thin inner ends of the levers 10. The outer ends of the key-shanks 1 and levers 10 are beveled selectively, so that when the register is applied to one of the key-boxes 2, the lever or levers 10 in engagement with a notch or notches of wheel 15 will be caused to disengage said wheel, and the lever or levers 10 in engagement with a notch or notches of wheel 16 will be caused to disengage said wheel, so freeing wheels 15 and 16, provided the arrangement of the key-shanks 1 of that key-box corresponds to the arrangement of the notches of wheels 15 and 16 then opposite the inner ends of levers 10. Unless such arrangement of notches does correspond to such arrangement of keys, the register 7 cannot be thrust onto the key box far enough to permit the operation of the hereinafter described stepping mechanism.

For advancing the wheels 15 and 16 step by step, as the watchman passes from one station to another, a push-button 17 is provided, which button is normally pressed out by a spring 18. This push button, as it is pressed inward, acts, through a lever 19, upon a ratchet pawl 20, engaging the teeth of a ratchet wheel 21, on the shaft 22 of wheel 15, and drivingly connected thereto. Motion is communicated through shaft 22, and gears 23, 24, and 25, to the shaft 26 of wheel 16. Thus wheels 15 and 16 are rotated together by the action of push-button 17.

In order that the push-button may not be operated effectively to rotate notched wheels 15 and 16 unless the tubular portion 9 of the register has been thrust the full distance over the tubular portion 4 of the key box (and, as explained previously, this can be done only when the register is applied to a key box the key arrangement of which corresponds to the particular arrangement of notches of wheels 15 and 16 then presented to the inner ends of levers 10) a spring lever 27 is provided, the end 29 of which is normally engaged with a hole in a wheel 28 on the shaft 26 of wheel 16. Said lever 27 is provided with a projection 29$^a$ which, when the tubular portion 9 is thrust fully home over the tubular portion 4 of the key box, is engaged by that tubular portion 4 and pushed inward, so disengaging lever 27 from wheel 28, and permitting rotation of wheel 28 under the influence of the push-button.

In order that the watchman may actuate the push-button once only for each application of the register to a key box, the shank of the push-button is provided with a spring pawl 30 which, when the push-button is pressed inward, engages a lug 31 on the lever 27. Thereby the push-button is held against return until, the register having been withdrawn from the key box, lever 27 retracts, so disengaging lug 31 from the pawl 30.

One or more of the levers 10 is or are provided with a spring 32 tending to cause that lever or levers to move into engagement with wheel 15; the others of said levers 10 are provided with springs 33 tending to cause such other levers 10 to move into engagement with the wheel 16.

The shaft 26 is provided with a dial wheel 34 opposite a window 35 in casing 8; through which window the watchman may observe the numbers on the dial wheel and thus be assured that the mechanism of the register is operating as the push-button 17 is operated.

The main shaft 36 of the mechanism for driving the break wheel (upon which shaft the crank 14 is mounted) is provided with a locking-disk 37, notched at one point. One of the shafts of the rear train connecting wheels 15 and 16 is provided with a corresponding notched disk 38; the construction being such that when wheels 15 and 16 have been rotated through steps corresponding to the full number of key boxes to be visited, then, and not before, the watchman may rotate the crank 14, so winding up the transmitting mechanism of the call box, which then operates (upon release of lever 14) like an ordinary messenger call box. At the last station to be visited in the watchman's tour there will be socket B, similar to a switchboard socket, into which, before operating the crank 14, the watchman will thrust the connecting plug 39, connected by suitable wires to the contact mechanism of the register; and this socket is, of course connected by a suitable circuit to the central station. Therefore, when the register is operated by means of the crank 14, after all of the stations have been visited in turn and the registering mechanism of the register operated thereat, a signal will be sent to the central station, indicating, it will be noted, that the watchman has visited all of his stations, and in proper sequence; for it has been made clear above that only by visiting each of his stations in proper sequence, and properly operating the register at each station, can the watchman condition his register for operation at the next station, and can cause the notched disk 38 to rotate such distance that when the last station of the tour has been reached, the transmitting mechanism of the register can be operated.

It will be noted that, by the arrangement of the key-shanks 1 at each station to be visited in the tour, the key device at that station, which may be termed a "watchman's-register conditioning device" is individualized with respect to the key devices or watchman's-register conditioning devices at all of the other stations. It will be noted that the effect of the application of the watchman's-regiser to each such conditioning device (provided that conditioning device is the proper one) is to condition that register for operation of the step by step signal-transmitter controlling mechanism, and also to condition the register for application to the next conditioning device of the series. The effect is the same as if the register, for its successive operation, required the use in it of a plurality of keys in proper sequence, each key being different from all the others.

The signal finally sent by the watchman, when all of the stations have been visited in proper turn and the watchman's register properly applied to the conditioning devices at those stations and properly operated after such application to the conditioning devices, may be termed a "watchman's tour signal." In Fig. 6 I have indicated, more or less diagrammatically, a system comprising a plurality of watchman's route lay-outs each comprising a number of conditioning devices A; a socket B for each said route, and circuit conductors 40 to which the said sockets B are connected in series, the said circuit leading to a central station at which there are signal recording or receiving devices, represented generally by the relay 41. From a consideration of this figure it will be apparent how, by sending through the circuit one signal only for each watchman's route, when, and only when, the watchman having that route has completed his tour of the route, the number of signals to be sent through the circuit is greatly decreased, and, therefore, the number of watchman's routes which can be allotted safely to each circuit, is greatly increased.

It is not necessary that the signal transmitting mechanism be contained within the watchman's register itself. Instead, this signal transmitting mechanism may be substituted for the sockets B. This is indicated in Fig. 7 in which the circuit to the central station comprises a plurality of transmitters C, shown in Figs. 8 and 9, of the general nature of the transmitter shown in Figs. 1 and 3, which transmitter is provided with a locking device 42, normally preventing the operation of the transmitter, but permitting the operation of that transmitter when a watchman's register, properly conditioned for the purpose, has been applied to the transmitter and has released the transmitting mechanism from the holding action of the locking device. Fig. 8 shows the watchman's register as adapted for this purpose, applied to the transmitter; the mechanism of the register being similar to that shown in Figs. 1 and 3, except that there is no transmitter as a part of the register, but instead there is a push bar 43, arranged to be thrust out by a cam 44 when the step by step mechanism of the register has reached a stage corresponding to the visit to the final conditioning device of the series after all of the prior conditioning devices of the series have been visited in turn. This push bar 43, when so thrust out, is in a position to engage the stem 45 of the signal box locking device, when a watchman's register is applied to that signal box, and then, by turning the handle 46 of the watchman's register, the locking device of the signal box will be caused to release the transmitter of that box, so that the transmitter can be operated. Obviously the bar 43 is in effect a key, and its end can be shaped so that only by that key can the locking mechanism of the signal device be released.

The transmitters C of Figs. 7, 8, and 9 are in effect the ordinary spring-driven transmitters such as are commonly called messenger call boxes, and must each be wound by application of a suitable key, before the watchman's register D is applied thereto for the sending of a signal. Such transmitters usually comprise an escapement 47, the motion of which is controlled by a pendulum 48. The particular locking means I have shown for normally preventing this transmitting mechanism from running, is a pin 42 mounted upon the stem 45, and normally engaging a pin 49 on the pendulum 48. When the key 43 of the watchman's register has been thrust into the corresponding socket of the stem 45 of the transmitter, and the hand lever 46 is actuated, this pin 42 is turned out of the path of the pin 49; and, the spring of the transmitter having previously been wound, the signal of that transmitter, as cut upon the break wheel 50 of the transmitter, is transmitted to the central office in the usual manner.

If desired, all of the conditioning devices of the system may be electrically supervised. Without limiting myself to any particular details of mechanism for this purpose, I have illustrated in Figs. 1, 6, and 7 one possible arrangement of such supervisory apparatus; the same comprising a contact in each conditioning device, which contact is normally closed, and, in the arrangement shown in Fig. 1, consists of two contact plates 51 and 52 held in contact with each other by the same spring 6, which holds the key shanks 1 in place. As will be seen in Figs. 6 and 7, a supervisory circuit 53 extends through these contacts of the conditioning devices, in series, so that tampering with any one of the conditioning devices resulting in the loosening of the key shanks 1 will break this supervisory circuit 53. As means for making the breaking of this superivsory system effective for the transmission of signals, I have indicated a relay 54 in the supervisory circuit 53, controlling a "buzzer" relay 55 in a local circuit controlled by 54, the "buzzer" relay 55 controlling the circuit 40 leading to the central station relay 41. The circuit through the front contact of "buzzer" relay 55 is normally closed, and, therefore, this relay does not in any way interfere with the sending of watchman's signals through the sockets B of the main circuit 40 to the central station relay 57; signals so sent consisting, usually, of some numeral as cut upon the break wheel of the transmitter of the watchman's register (in the Fig. 6 arrangement) or of the transmitter C (in the Fig. 7 arrangement). But in the event of breakage of the supervisory circuit 53, the operation of the "buzzer" relay 55 will have the effect of sending in a large number of dots continuously, and at a rate such that this trouble signal is readily distinguishable from the watchman's signals. Of course, any other arrangement for sending a trouble signal to the central station may be employed.

It will be observed that the construction of the watchman's register is such that if the case be opened by the watchman by the removal of the screws holding the case proper to the base, the mechanism within that case will fall apart; and the construction of this mechanism is such that reassembling thereof is practically impossible without the use of special tools and a higher degree of skill than the ordinary person possesses. It has already been explained that the key boxes themselves are protected against tampering by the fact that if the case of the key box be removed, the key shanks will fall away. By their mechanical construction, therefore, both the key box and watchman's register are protected against tampering, in that, if tampered with, they cannot be reassembled readily. Of course, various other means may be provided for preventing tampering with the key devices or with the mechanism of the portable register, and various constructions of key devices may be employed together with various devices for preventing operation of locking mechanism of the portable register by anything but the intended key device of the key boxes at the various watchmen's stations. In general it may be said that I do not limit myself in any way to the details of construction herein illustrated and described, the particular details illustrated and described constituting merely particular embodiments of my invention.

The subject-matter of Figs. 8, 8ᵃ, 9 and 10, embodying a signal transmitter at one or more of the stations, and a portable register comprising means for controlling the transmission of signals by such station transmitter, forms the subject matter of a divisional application, Serial No. 303,594 filed June 12, 1919.

What I claim is:

1. A watchman's signal system comprising a plurality of stations each having a conditioning device, signal transmitting means adapted to send a watchman's tour signal, and a portable device separate from said conditioning devices but adapted to be applied thereto successively and comprising means, affected by such application to said conditioning devices, for preventing the sending of a watchman's tour signal by said transmitting means unless and until all of said stations have been visited and the said portable device applied to all of said conditioning devices.

2. A watchman's signal system comprising a plurality of stations, each having a watchman's register conditioning device, signal transmitting means, adapted to send a watchman's tour signal, and a portable watchman's register adapted to be applied to each of the said register-conditioning devices, and comprising mechanism affected by application to said conditioning devices and arranged to prevent the sending of a watchman's tour signal by said transmitting means unless and until said register mechanism has been conditioned by the conditioning device at each of said stations.

3. A watchman's signal system comprising a plurality of stations each having a watchman's register conditioning device, signal transmitting means adapted to send a watchman's tour signal, a portable watchman's register comprising transmitter controlling mechanism controlling said signal transmitting means, and arranged to prevent the sending of a watchman's tour signal thereby until such transmitter controlling mechanism has reached a predetermined stage, said transmitter controlling mechanism comprising means, controlled by said register-conditioning devices, for advancing such mechanism step by step to the stage at which the operation of said transmitting means will be permitted.

4. A watchman's signal system comprising a plurality of stations, each having a watchman's-register conditioning device, such devices being each individualized with respect to the others of the series, signal transmitting means adapted to transmit watchman's tour signals, and a portable watchman's register adapted to be applied to each of the said register conditioning devices, and comprising mechanism affected by application to said conditioning devices and arranged to prevent the sending of a watchman's tour signal by said transmitting means unless and until said register mechanism has been conditioned by the conditioning device at each of said stations.

5. A watchman's signal system comprising a plurality of stations, each having a watchman's register conditioning device, such devices being each individualized with respect to the others of the series, signal transmitting means adapted to transmit watchman's tour signals, a portable watchman's signal register comprising transmitter controlling mechanism controlling said signal transmitting means and arranged to prevent the sending of a watchman's tour signal thereby until such transmitter controlling mechanism has reached a predetermined stage, said transmitter controlling mechanism comprising means, controlled by said register-conditioning devices, for advancing such mechanism step by step to the stage at which the operation of said transmitting means will be permitted.

6. A watchman's signal system comprising a plurality of stations, each having a watchman's-register conditioning device, in combination with a portable watchman's-register comprising signal transmitting means adapted to transmit watchman's tour signals, and means for connecting the same to a signal circuit, said register being adapted to be applied to each of the said register conditioning devices, and comprising mechanism affected by application to said conditioning device and arranged to prevent the sending of a signal by said transmitting means unless and until said register mechanism has been conditioned by the conditioning device at each of said stations.

7. A watchman's signal system comprising a plurality of stations, each having a watchman's-register conditioning device, and a portable watchman's signal register comprising signal transmitting means adapted to transmit watchman's tour signals and means for connecting the same to a signal circuit, said register comprising means controlling said transmitting means and arranged to prevent the sending of a signal thereby until such transmitter controlling means has reached a predetermined stage, said transmitter controlling means comprising means, controlled by said register-conditioning devices, for advancing such transmitter controlling means step by step to a stage at which the operation of said transmitting means will be permitted.

8. A signal system comprising a plurality of register conditioning devices, in combination with a portable register adapted to be engaged with said register conditioning devices and having transmitter controlling mechanism arranged for successive actuation under control of said register conditioning devices, and signal transmitting mechanism controlled by said controlling mechanism of the register, such controlling mechanism arranged to prevent operation of the transmitting mechanism except when and after such controlling mechanism has been operated upon engagement with each of said register conditioning devices.

9. A signal system comprising signal transmitting means, controlling means therefor, adapted to prevent transmission of signals thereby until a particular stage in the operation of said controlling means has been reached, and a plurality of conditioning devices normally unconnected with said controlling means but each comprising means with which such controlling means may be engaged and by which, when so engaged, said controlling means will be affected and caused to advance, such controlling means comprising mechanism adapted to advance by successive stages, each corresponding to engagement of such mechanism with one of said conditioning devices, until the stage at which a signal may be sent by said transmitting mechanism is reached.

10. A signal system comprising a plurality of register conditioning devices, in combination with a portable register adapted to be engaged with said register conditioning devices successively, and having step by step transmitter controlling mechanism, actuating means therefor, and means, controlled by said register conditioning devices, permitting advance of said step by step mechanism by sucessive stages when, and only when, said register is correspondingly engaged with said conditioning devices, and signal transmitting mechanism controlled by said controlling mechanism of the register, such controlling mechanism arranged to prevent operation of the transmitting mechanism until said register has been engaged by each of said conditioning devices, and its step by step mechanism has been advanced correspondingly.

11. A signal transmitter comprising transmitting mechanism, and step by step controlling means therefor, arranged to prevent the sending of signals by said transmitting mechanism until said step by step mechanism has reached a predetermined stage, actuating means for said step by step mechanism, and locking means preventing advance of said step by step mechanism until actuated, said locking means adapted for actuation successively by successive conditioning means external to and separate and normally entirely disconnected from said transmitter and locking means, but to which conditioning means said locking means of the transmitter is adapted to be applied mechanically.

12. A signal transmitter comprising transmitting mechanism, and step by step controlling means therefor arranged to prevent the sending of signals by said transmitting mechanism until said step by step mechanism has reached a predetermined stage, actuating means for said step by step mechanism, and locking means preventing advance of said step by step mechanism until actuated, said locking means comprising a notched disk drivingly connected with step by step mechanism, and a locking lever normally engaging said disk but adapted to be disengaged therefrom by engagement of said lever with an external lever-actuating device distinct from and independent of said signal transmitter.

13. A signal transmitter comprising transmitting mechanism, and step by step controlling means therefor arranged to prevent the sending of signals by said transmitting mechanism until said step by step mechanism has reached a predetermined stage, actuating means for said step by step mechanism, and locking means preventing advance of said step by step mechanism until actuated, said locking means comprising two notched disks both drivingly connected with said step by step mechanism, and a plurality of locking levers between said disks, one or more of said levers normally engaging one of said disks and other or others of said levers normally engaging the other said disk, all said levers adapted to be disengaged from their disks by engagement of said levers with an external lever actuating device distinct from and independent of said signal transmitter.

14. A watchman's register comprising transmitter-controlling means, step by step operating mechanism therefor adapted for actuation by the watchman by successive stages, and locking means normally preventing such advance of the step by step mechanism but adapted to be conditioned to permit limited advance by application to external conditioning means.

15. A watchman's register comprising transmitter-controlling means, step by step operating mechanism therefor adapted for actuation by the watchman by successive stages, and locking means normally preventing such advance of the step by step mechanism but adapted to be conditioned to permit advance, one step at a time, by application to external conditioning means.

16. A watchman's register comprising transmitter-controlling means, step by step operating mechanism therefor adapted for actuation by the watchman by successive stages, and locking means normally preventing such advance of the step by step mechanism but adapted to be conditioned to permit advance, one step at a time, by application to external conditioning means, said locking means comprising means whereby it may be operated only by relatively individualized conditioning means.

17. A watchman's register comprising transmitter-controlling means, step by step operating mechanism therefor adapted for actuation by the watchman by successive stages, and locking means normally preventing such advance of the step by step mechanism but adapted to be conditioned to permit advance, one step at a time, by application to external conditioning means, said locking means comprising means whereby it may be operated only by relatively individualized conditioning means, and may be operated by any one such conditioning means only once for each tour.

18. A watchman's register comprising transmitter-controlling means, and operating means therefor comprising locking means normally preventing operation of such operating means but adapted to be conditioned to permit limited operation of such operating means by application to external conditioning means.

19. A watchman's register comprising transmitter-controlling means, and operating means therefor comprising locking means normally preventing operation of such operating means but adapted to be conditioned to permit limited operation of such operating means by application to external conditioning means, said locking mechanism comprising a notched disk drivingly connected with said operating means, and a locking lever normally engaging such disk but adapted to be disengaged therefrom by engagement of said lever with external conditioning means.

20. A watchman's register comprising transmitter-controlling means, and operating means therefor comprising locking means normally preventing operation of such operating means but adapted to be conditioned to permit limited operation of such operating means by application to external conditioning means, said locking means comprising two notched disks both drivingly connected with said operating means, and a plurality of locking levers between said disks, one or more of said levers normally engaging one of such disks and the other or others of said levers normally engaging the other said disk, all of said levers adapted to be disengaged from their disks by engagement of said levers with an external conditioning device.

21. A signal system comprising a plurality of key boxes, and a portable register, each key box having a key device distinguished from the similar devices of the other key boxes, and the portable register having means for giving an indication that the various key boxes have been visited, comprising locking means to permit advance thereof, arranged to be operated by application to the key device.

22. A signal system comprising a plurality of key boxes, and a portable register, each key box having a key device distinguished from the similar devices of the other key boxes, and the portable register having means for giving an indication that the various key boxes have been visited, comprising locking means to permit advance thereof, arranged to be operated by application to the key devices, said key devices and locking means being interrelated in such manner that application of the portable register to one of the key devices conditions that locking means for application to the key device next in series.

23. A signal system comprising a plurality of key boxes, and a portable register, each key box having a key device distinguished from the similar devices of the other key boxes, and the portable register having means for giving an indication that the various key boxes have been visited, comprising locking means to permit advance thereof, arranged to be operated by application to the key devices, said key devices and locking means being interrelated in such manner that application of the portable register to one of the key devices conditions that locking means for application to the key device next in series, and that the locking means, after operation by one key device, may be operated only by that key device which is intended to be next in series.

24. A signal system comprising a plurality of key boxes, each such key box comprising a plurality of members together constituting a key device, and a portable register having signal controlling means adapted to be applied to the key devices of said key boxes successively, whereby the mechanism of the portable register is conditioned by successive steps for final operation, each such key box having contacts which will be operated in the event of tampering with that box, and a supervisory circuit extending through the said contacts of the key boxes and comprising means arranged to give an indication in the event of disturbance of that circuit.

25. A key box for signal systems such as described, comprising a base, a plurality of key shanks together constituting a key device, a case surrounding said key shanks but having an aperture through which a device to be operated by said key shanks may be applied thereto, and spring means normally holding said key shanks in place and normally held in coöperative relation to said key shanks by said case.

26. A signaling system comprising a plurality of stations, one of which comprises terminals of a signaling circuit, and portable means comprising a signal transmitter together with means for operatively connecting the same to said signaling circuit terminals, said portable means and certain of said stations together comprising means for registering visits to said stations.

27. A signaling system comprising a plurality of stations, one of which comprises terminals of a signaling circuit, and portable means comprising a signal transmitter together with means for operatively connecting the same to said signaling circuit terminals, said portable means and certain of said stations together comprising means for registering visits to said stations together with means for preventing sending of signals by said transmitter unless and until a station other than that at which such circuit terminals are located has been visited.

In testimony whereof I have signed this specification in the presence of two subscribing witnesses.

CLARENCE C. JOHNSON.

Witnesses:
  H. M. MARBLE,
  ETHEL JOHNES.